US012051121B2

(12) United States Patent
Bones et al.

(10) Patent No.: US 12,051,121 B2
(45) Date of Patent: *Jul. 30, 2024

(54) ANALYSIS AND PRESENTATION OF AGRICULTURAL DATA

(71) Applicant: CLIMATE LLC, Saint Louis, MO (US)

(72) Inventors: Tavis Bones, Morton, IL (US); Jakob Stuber, Tremont, IL (US); Kyle Plattner, Edwards, IL (US); Joshua Merryman, Adel, IA (US); Oriana Lisker, Oakland, CA (US); Doug Sauder, Livermore, CA (US); Christopher H. Barron, San Francisco, CA (US)

(73) Assignee: CLIMATE LLC, Saint Louis, MO (US)

( * ) Notice: Subject to any disclaimer, the term of this patent is extended or adjusted under 35 U.S.C. 154(b) by 844 days.

This patent is subject to a terminal disclaimer.

(21) Appl. No.: 17/001,021

(22) Filed: Aug. 24, 2020

(65) Prior Publication Data

US 2021/0042858 A1    Feb. 11, 2021

Related U.S. Application Data

(63) Continuation of application No. 15/976,574, filed on May 10, 2018, now Pat. No. 10,755,367.

(51) Int. Cl.
*G06Q 50/02* (2024.01)
*G06F 16/29* (2019.01)
*G06Q 40/12* (2023.01)

(52) U.S. Cl.
CPC ............. *G06Q 50/02* (2013.01); *G06F 16/29* (2019.01); *G06Q 40/12* (2013.12)

(58) Field of Classification Search
CPC ........ G06Q 50/02; G06Q 40/12; G06F 16/29; A01B 79/005
See application file for complete search history.

(56) References Cited

U.S. PATENT DOCUMENTS

| 6,990,459 B2 | 1/2006 | Schneider |
| 9,667,710 B2 | 5/2017 | Wilbur |

(Continued)

FOREIGN PATENT DOCUMENTS

| WO | WO 2016/127094 A1 | 8/2016 |
| WO | WO 2019217568 A1 | 11/2019 |

OTHER PUBLICATIONS

The International Searching Authority, "Search Report" in application No. PCT/US19/31340, dated Jul. 22, 2019, 14 pages.

(Continued)

*Primary Examiner* — Michael Jared Walker
*Assistant Examiner* — Reva R Moore
(74) *Attorney, Agent, or Firm* — Harness, Dickey & Pierce, P.L.C.

(57) ABSTRACT

A computer-implemented method of managing data related to an agricultural process is disclosed. The method comprises causing, by a processor, display of a first map of one or more agricultural fields, the first map indicating a first type of a plurality of types of farming data associated with the one or more agricultural fields; receiving, by the processor, cost data corresponding to a second type of the plurality of types of farming data associated with the one or more agricultural fields; receiving revenue data associated with the one or more agricultural fields; performing a return-on-investment (RoI) analysis for the one or more agricultural fields having a plurality of components, including cost data associated with a third type of the plurality of types of farming data, the revenue data, and corresponding RoI data; causing display of a second map of the one or more (Continued)

agricultural fields concurrently with the first map, the second map indicating a first component of the plurality of components of the RoI analysis; receiving a selection of points from the second map, the selection corresponding to a boundary of a region within the one or more agricultural fields; causing display of a report indicating the first component of the RoI analysis specific to the region.

20 Claims, 19 Drawing Sheets

(56) References Cited

U.S. PATENT DOCUMENTS

| | | | |
|---|---|---|---|
| 9,959,507 | B2 | 5/2018 | Mathur |
| 10,028,426 | B2 | 7/2018 | Schildroth |
| 10,115,158 | B2 | 10/2018 | Lindores |
| 10,171,564 | B2 | 1/2019 | Wilbur |
| 10,398,096 | B2 | 9/2019 | Hassanzadeh |
| 10,667,474 | B2 | 6/2020 | Rowan |
| 10,755,367 | B2 | 8/2020 | Bones et al. |
| 2002/0022928 | A1 | 2/2002 | Ell |
| 2006/0043653 | A1 | 3/2006 | Chretien |
| 2008/0130955 | A1 | 6/2008 | Harrison et al. |
| 2008/0304711 | A1 | 12/2008 | Scharf |
| 2009/0043653 | A1 | 2/2009 | Sandor et al. |
| 2011/0196710 | A1* | 8/2011 | Rao .................. G06Q 40/04 705/37 |
| 2014/0039967 | A1 | 2/2014 | Scharf |
| 2014/0089045 | A1 | 3/2014 | Johnson |
| 2015/0025926 | A1 | 1/2015 | Green |
| 2015/0066932 | A1 | 3/2015 | Stuber et al. |
| 2015/0106434 | A1 | 4/2015 | Fiene |
| 2016/0004223 | A1 | 2/2016 | Scharf |
| 2016/0042232 | A1 | 2/2016 | Scharf et al. |
| 2016/0253595 | A1 | 9/2016 | Mathur |
| 2016/0308954 | A1 | 10/2016 | Wilbur |
| 2017/0013772 | A1 | 1/2017 | Kirk et al. |
| 2017/0030877 | A1 | 2/2017 | Miresmailli et al. |
| 2017/0039449 | A1 | 2/2017 | Schaf |
| 2017/0257426 | A1 | 9/2017 | Wilbur |
| 2018/0132422 | A1 | 5/2018 | Hassanzadeh |
| 2018/0146612 | A1 | 5/2018 | Sauder |
| 2018/0314949 | A1* | 11/2018 | Bender .................. G06Q 50/02 |
| 2018/0322426 | A1 | 11/2018 | Schmaltz |
| 2019/0014727 | A1 | 1/2019 | Rowan |
| 2019/0057461 | A1 | 2/2019 | Ruff |
| 2019/0124855 | A1 | 2/2019 | Rowan |
| 2019/0347745 | A1 | 11/2019 | Bones |
| 2020/0008371 | A1 | 1/2020 | Hassanzadeh |

OTHER PUBLICATIONS

Current Claims in application No. PCT/US19/31340, dated Jul. 2019, 4 pages.
Bones, U.S. Appl. No. 15/976,574, filed May 10, 2018, Notice of Allowance, Jul. 1, 2020.
Claims in China application No. 201980031349.2, dated May 27, 2021, 4 pages.
China Patent Office, "Office Action" in application No. 201980031349.2, dated May 27, 2021, 7 pages.
Australian Patent Office, "Search Report" in application No. 2019265649, dated Feb. 5, 2021, 7 pages.
Australian Claims in application No. 2019265649, dated Feb. 2021, 4 pages.
The International Bureau of WIPO, "Preliminary Report on Patentability", in application No. PCT/US2019/031340, dated Nov. 10, 2020, 7 pages.
Current Claims in application No. PCT/US2019/031340, dated Nov. 2020, 4 pages.
Australian Patent Office, "Office Action" in application No. 2019265649, dated Nov. 20, 2020, 6 pages.
Australian Claims in application No. 2019265649, dated Nov. 2020, 4 pages.
U.S. Appl. No. 15/976,574, filed May 10, 2018, Bones et al.
U.S. Appl. No. 15/976,574: Notice of Allowance dated Jul. 1, 2020. The instant application is a continuation of U.S. Appl. No. 15/976,574.
PCT/US2019/031340: International Search Report and Written Opinion Jul. 22, 2019. PCT/US2019/031340 has the same priority claim as the instant application.
EP 19800340.2: Search Report dated Dec. 22, 2021. EP 19800340.2 has the same priority claim as the instant application.
IN 202027052450: Examination Report dated Jan. 28, 2022. IN 202027052450 has the same priority claim as the instant application.

* cited by examiner

Fig. 2
(a)
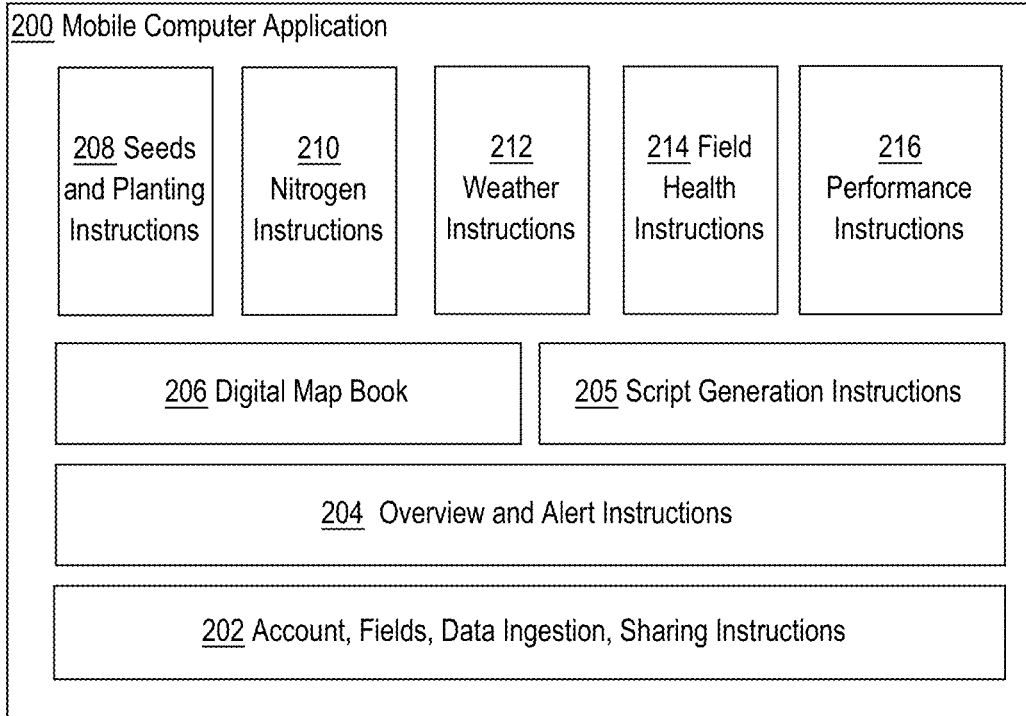
(b)
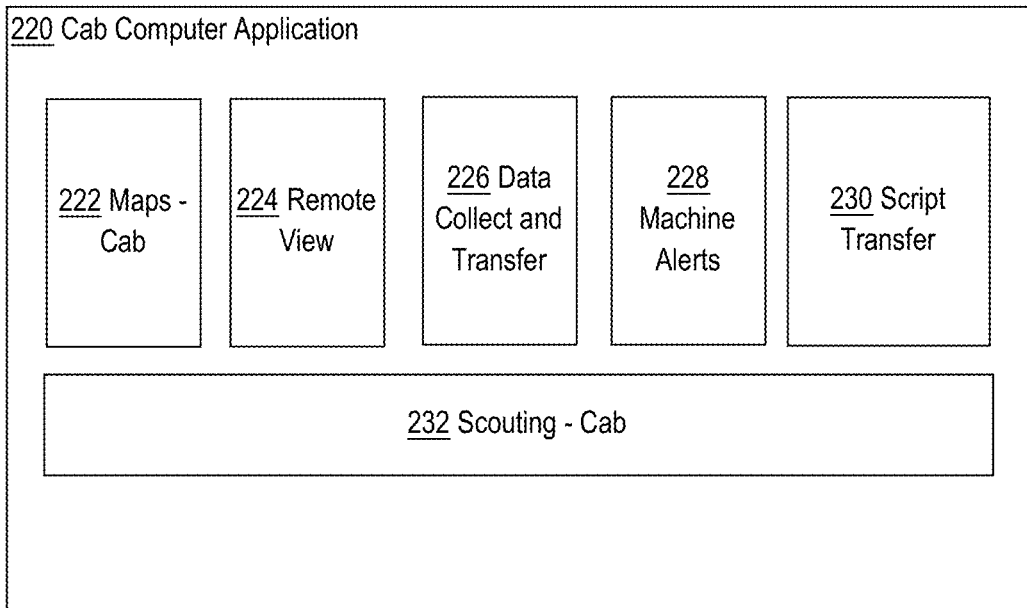

Data Manager

| Planting 1(4 Fields) | Planting 2(0 Fields) | Planting 3(0 Fields) | Planting 4(1 Fields) | + |
| --- | --- | --- | --- | --- |
| Crop Corn Product | Crop Corn Product | Crop Corn Product | Crop Corn Product | Add New |
| Plant Date: 2016-04-12 | Plant Date: 2016-04-15 | Plant Date: 2016-04-13 | Plant Date: 2016-04-13 | Planting Plan |
| ILU 112 \| Pop: 34000 | ILU 83 \| Pop: 34000 | ILU 83 \| Pop: 34000 | ILU 112 \| Pop: 34000 | |
| [Edit] [Apply] | [Edit] [Apply] | [Edit] [Apply] | [Edit] [Apply] | |

Nitrogen | Planting | Practices | Soil

| | CROP | PLANTED ACRES | PRODUCT | RELATIVE MATURITY | TARGET YIELD | POPULATION(AVG) | PLA |
| --- | --- | --- | --- | --- | --- | --- | --- |
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

ANALYSIS AND PRESENTATION OF AGRICULTURAL DATA

BENEFIT CLAIM

This application claims the benefit under 35 U.S.C. § 120 as a Continuation of application Ser. No. 15/976,574, filed May 10, 2018, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2020 The Climate Corporation.

FIELD OF THE DISCLOSURE

The present disclosure relates to the technical area of agricultural data management and graphical user interface and more specifically to the technical area of enabling the efficient exploration, reviewing, analyzing, and/or manipulating of farming and financial data associated with different layers of an agricultural process in almost real time.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An agricultural process may be long and complex. An example starts with purchasing seeds and ends with harvesting crops, possibly involving applying fertilizers, pesticide, or fungicide to soil or crops, watering soil, drying grains, and so on. Various costs and revenue may be associated with different layers of an agricultural process. Furthermore, different agricultural processes may be implemented on different fields, further complicating any cost-and-benefit or return-on-investment ("ROI") analysis for a grower. It would be helpful to enable growers to explore, review, analyze, and/or manipulate cost and revenue data associated with agricultural processes implemented on individual fields or across multiple fields in almost real-time, and ultimately better understand how to improve the overall return on investment.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 7 illustrates an example screen configured to receive cost data for different seed hybrids.

DETAILED DESCRIPTION

Figure 1:
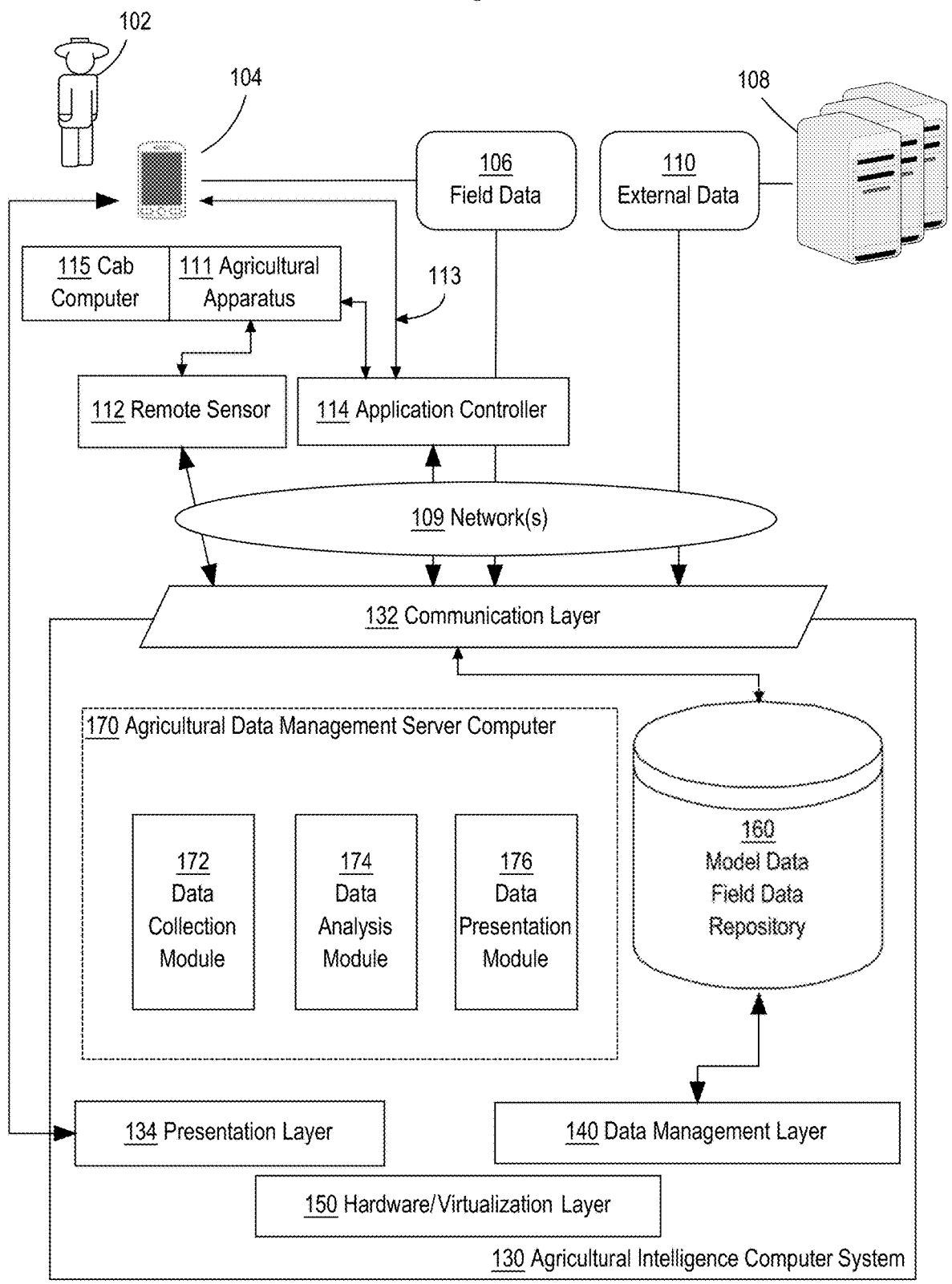
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. FUNCTIONAL DESCRIPTION
   3.1 DATA COLLECTION
   3.2 DATA ANALYSIS AND PRESENTATION
   3.3 EXAMPLE PROCESSES
4. EXTENSIONS AND ALTERNATIVES

1. GENERAL OVERVIEW

An agricultural data management server computer ("server") for managing data related to an agricultural process is disclosed. An agricultural process may include many stages or operations, such as preparing soil, sowing, adding manure and fertilizers, irrigation, harvesting, or storage. Existing computer platforms might capture different types of farming data corresponding to these operations, including yield data. However, a grower ultimately would like to make profits and could benefit from exploring, reviewing, analyzing, and/or manipulating different types of financial data associated with these operations and corresponding farming data, such as costs, revenue, and returns on investment ("RoI") being the difference between revenue and costs.

In some embodiments, the server is programmed or configured with data structures and/or database records that are arranged to analyze the financial data associated with different types of farming data and enable almost real-time, user-friendly data visualization and other exploration, review, further analysis, and/or manipulation of the analysis results. A grower may own one or more fields, growing different types of crops and implementing different farming practices on the one or more fields. For example, the grower may plant two different seed hybrids in alternating rows across two fields and applying insecticide to one of the fields. The server can be programmed to request input of the costs of purchasing or planting the two seed hybrids for the two fields as soon as such prices may become available. Throughout the agricultural process, which may span multiple seasons, the server can be programmed to also request input of other types of costs, especially those that vary within the one or more fields, to enable the grower to gain further comparative insight. In this example, the other types of costs may include the cost of purchasing or applying pesticide. Towards the end of the agricultural process, the server can be programmed to then request input of the revenue produced by the one or more fields.

In some embodiments, throughout the agricultural process, the server can be programmed to enable exploration, review, analysis, and/or manipulation of the different types of farming data, the associated financial data, and related environment climate data. When any revenue data is available, the server can be programmed to perform different types of RoI analysis at different geographical granularities and enable visualization of analysis results to a user computer through interactive maps. Each type of RoI analysis typically involves calculating the difference between the revenue amounts and one or more types of costs associated with one or more types of farming data. For example, the RoI analysis could include comparing the revenue against the cost of purchasing a seed hybrid or the sum of the cost of purchasing a seed hybrid and the cost of applying pesticide. Different types of RoI analysis may lead to RoI data presented in different manners. For example, one type of RoI analysis may involve presenting the RoI value for each location relative to an aggregate value, and another type of RoI analysis may involve presenting the RoI value for each location relative to a prior time period. Yet another type of RoI analysis may involve presenting RoI values that satisfy a criterion differently from those RoI values that do not satisfy the criterion. For example, a map can be presented highlighting those locations where the RoI value is above a certain threshold.

In some embodiments, the server can be programmed to allow exploration, review, analysis, and/or manipulation of all relevant data in an RoI analysis in a flexible yet streamlined manner through a pair of interactive maps corresponding to the same geographical area. Each of the interactive maps can indicate any of a plurality of types of data relevant in an RoI analysis corresponding to a specific period of time, including the different types of farming data, the cost data associated with the different types of farming data, the revenue data, and corresponding RoI data. The two maps can be displayed simultaneously on the screen, and each can be reused to display a new type of data relevant in an RoI analysis. Such concurrent and reusable display makes it easier to understand the value variations in one of the maps and the progression of an RoI analysis in general. For example, in response to a selection of purchased seed hybrids as indicated by data input to a user computer, a first map corresponding to one or more fields may be displayed indicating the seed hybrid planned or planted for each location in the first map. In other embodiments, other types of data relevant in an RoI analysis can be inputted and accepted. In response to a selection of cost data associated with the purchased seed hybrids, a second map corresponding to the one or more fields may be displayed next to the first nap indicating the cost data for each location in the second map. In response to a selection of yields, the second map may be re-displayed indicating the yield data for each location in the second map. Furthermore, in response to a selection of returns on seeds (e.g., the difference between the revenue amounts and the costs of purchasing the seed hybrids), the first map may be re-displayed indicating the returns on seeds. Further interaction with the maps is possible. For example, a user computer may select a location on the first map indicating a particular seed hybrid and enter a cost for purchasing that particular seed hybrid, or a user computer may select a location on the second map indicating a particular yield and enter a price of selling the yielded crop. Similarly, a user computer may specify the boundary of an arbitrary region on the second map indicating the returns on seeds and obtain further data regarding the returns on seeds specific to the specified region.

In some embodiments, the server can be programmed to further determine recommendations based on the RoI analysis and present them to user computers. For example, the server can be configured to identify those regions within the one or more fields that have yielded the lowest RoIs, and determine any cost associated with one of the different types of farming data that highly correlates with the revenue for these regions. Those regions can then be highlighted on the map with an overlaid display suggesting a reduction of the cost associated with the one type of farming data. For further example, the server can be configured to determine similar upward trends in RoI data in two regions with identical or similar seed hybrids planted and farming practices implemented except that a first of the regions is ahead of a second of the regions in causing and experiencing and the upward trend. An RoI forecast for the second region based on the current RoI of the first region can then be sent to a user device.

The server produces many technical benefits. When efficacy of an agricultural trial is evaluated alongside the cost of the trial, the evaluation provides the most objective basis for comparing the utility and practical benefit of trials. The server makes it easier to evaluate the RoI values of product decisions for growers and dealers and leads to implementation of more effective trials and agricultural processes in general. More specifically, through streamlined data management, the server enables the exploration, review, analysis, and/or manipulation of different cost layers and the revenue data individually or in combination so that a user computer can drill down into a generally complex cost structure associated with an agricultural process and potentially gain additional insight into how certain costs might affect the RoI. The server also enables the exploration, review, analysis, and/or manipulation of such cost layers and revenue data as early as possible. This allows a user computer to perform relevant RoI analysis in almost real time (with respect to when the request for analysis is submitted) based on benchmarking data corresponding to certain geographical regions or time periods and adjust to current farming practices as appropriate. The management of historical data also improves the understanding of field and product performance over time that accounts for a variety of weather or management practice scenarios. In addition, the server enables the exploration, review, analysis, and/or manipulation of such cost layers and revenue data efficient graphical representation to visualize financial data in the geographical domain and receive correlations between different components of an RoI analysis. Furthermore, through various complex RoI analysis, the server enables user computers to make the best decisions in resource utilization, trial selection, or product placement in the fields.

2. EXAMPLE AGRICULTURAL INTELLIGENCE COMPUTER SYSTEM

2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
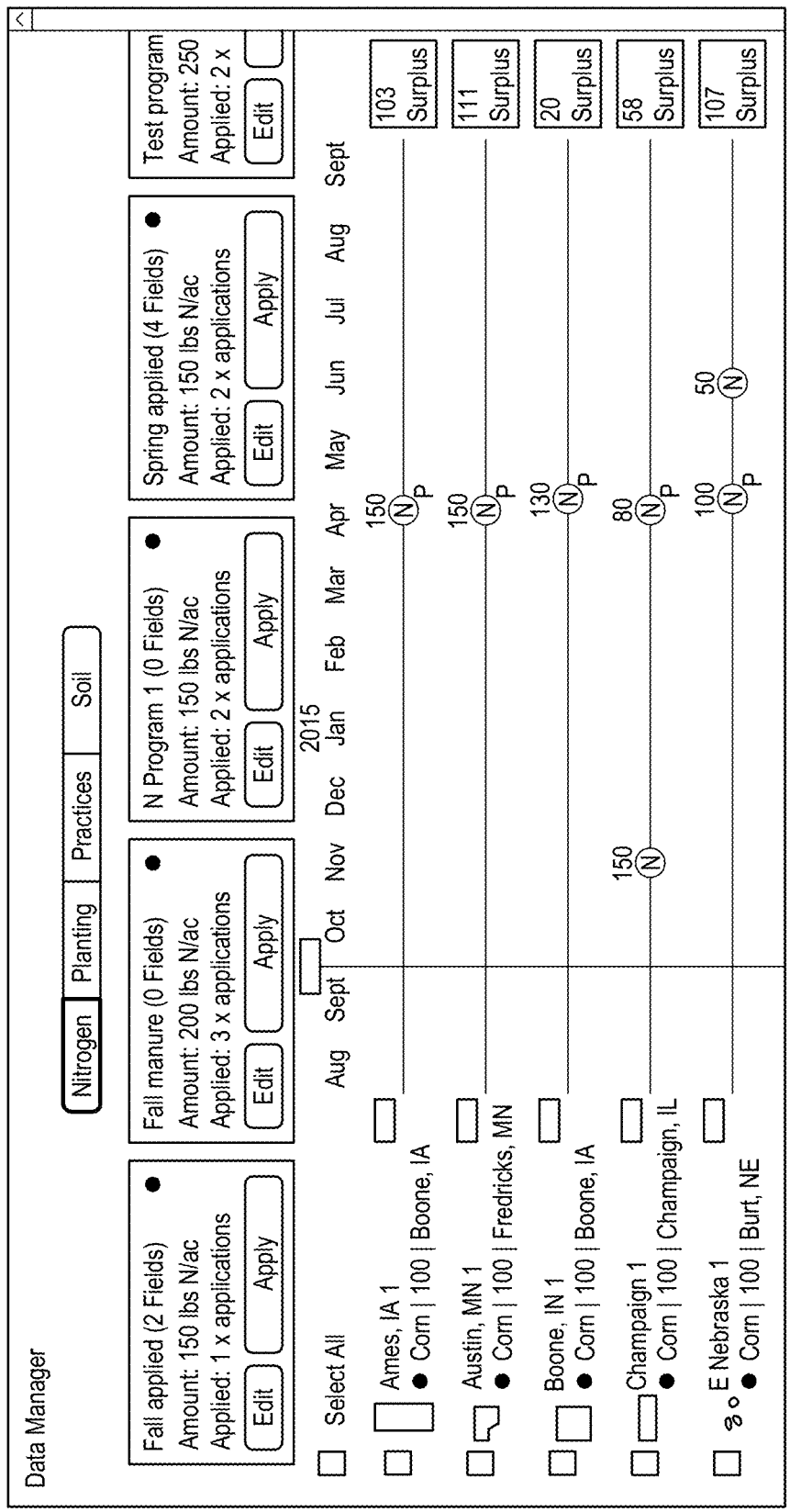
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, agricultural intelligence computer system 130 is programmed to comprise an agricultural data management server computer ("server") 170. The server 170 is further configured to comprise a data collection module 172, a data analysis module 174, and a data presentation module 176. The data collection module 172 is configured to collect additional data related to an agricultural process, such as costs and revenue corresponding to farming operations or data associated with the agricultural process. The data collection module 172 may be configured to provide reminders for input of such data or facilitate input of such data to expedite processing and further analysis of such data. The data analysis module 174 is configured to analyze data collected by the data collection module 172 and related data. The analysis could be comparative in nature along time, location, or other dimensions and could focus on costs associated with certain farming operations or data, revenue associated with yields, or returns on investment based on a combination of the costs. The data presentation module 176 is configured to present the collected data or results of analyzing the collected data through graphical user interfaces to facilitate data exploration, review, analysis, manipulation, visualization, and/or understanding. The data presentation module 176 can be configured to start with one or more maps of the agricultural fields of interest and present additional information, such as the collected cost data, on top of the maps to enable data visualization in growers' familiar geographical domain.

Each component of the server 170 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the data collection module 172 may comprise a set of pages in RAM that contain instructions which when executed cause performing the location selection functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component of the server 170 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
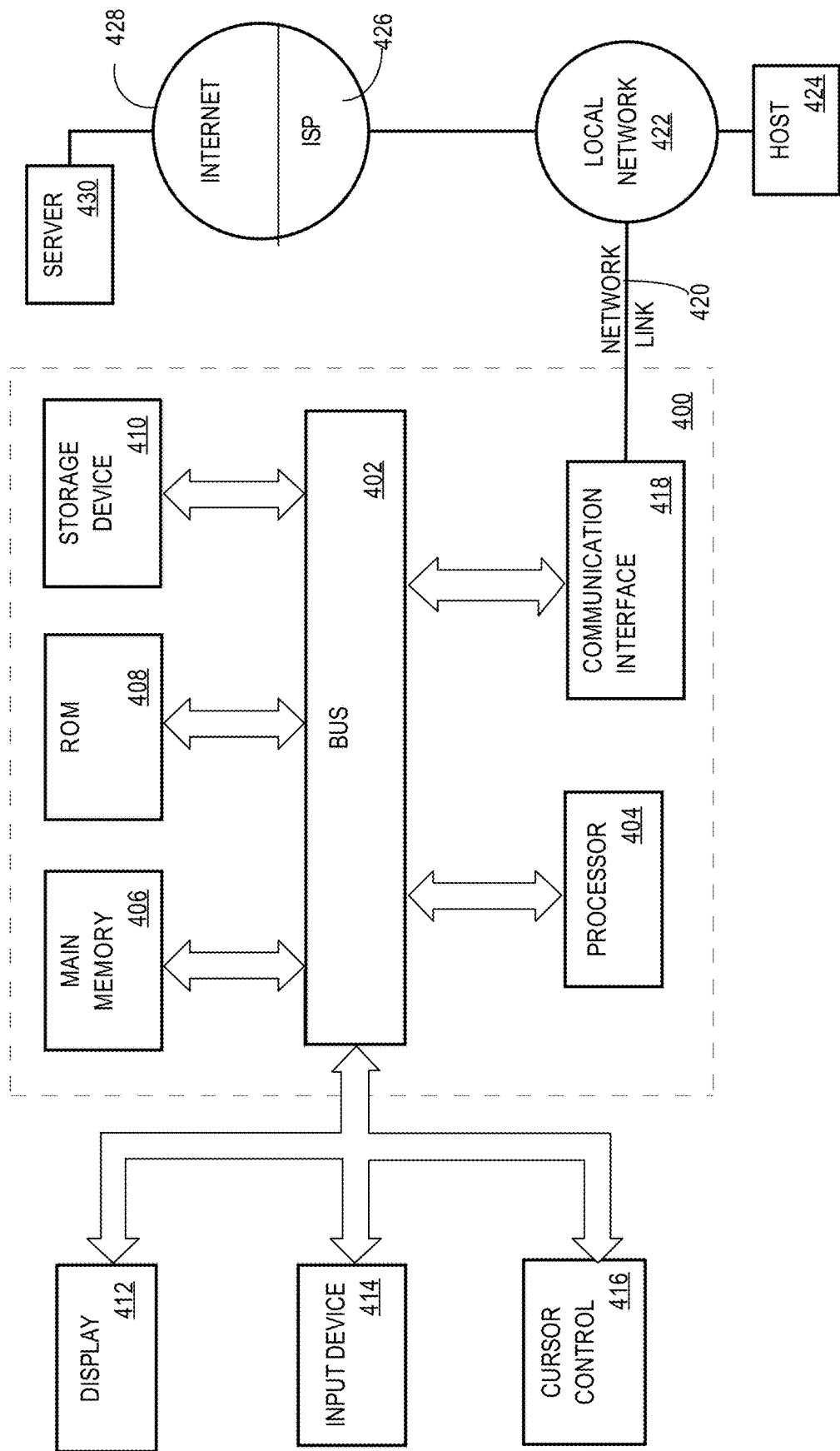
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
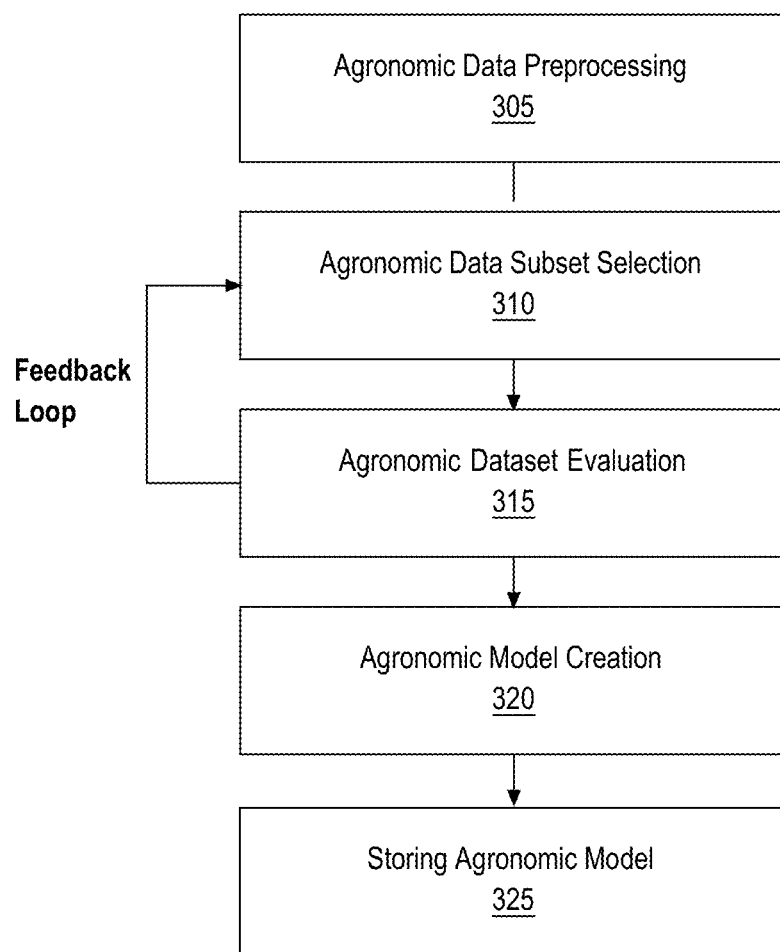
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. FUNCTIONAL DESCRIPTION

3.1 Data Collection

In some embodiments, the server 170 is programmed or configured to collect cost data from user devices, such as a grower device or a supplier computer. To enable comparative analysis between different farming regions, the cost data may include costs that often vary among different farming regions, such as the costs associated with purchasing and planting seed hybrids, applying fertilizers, pesticide, or fungicide to soil or crops, or drying grains. The cost data can also include other costs that are more or less constant or evenly distributed across different farming regions, such as the costs related to storage or certain farming cartridges.

In some embodiments, the server 170 is programmed to request input of cost data. The request can be presented at various points during an agricultural process. Typically, the cost data related to an item can be requested when other data related to the item is being requested or entered. This makes it easier to associate the costs incurred in implementing an agricultural process on a farming region with other data related to the farming region, such as soil data or environmental data. The cost data can also be requested at a specific point within a stage of an agricultural process or cycle, such as at the end of the planting stage or one month into the harvesting stage. In addition, the cost data can be requested when a request to perform an RoI analysis is received. It is generally preferable to receive cost data as early as possible in or prior to the current farming season to enable accurate cost-related calculations throughout an agricultural process.

In some embodiments, the server 170 is programmed to receive cost data from farmer devices or directly from devices of material or labor suppliers. For example, the server 170 may be configured to receive quotes for different seed hybrids in a catalog from a supplier system and receive a specification of the seed hybrids planted in a farm with possible price discounts from a farmer device, and the server 170 can be configured to then derive the actual costs of purchasing the seed hybrids planted in the farm. The server 170 can be programmed to further allow a specification of costs in specific units and perform necessary conversions. For example, for purchasing a specific seed hybrid, the received cost data may be expressed as a price per bag, and it can be converted to a standard unit, such as the price per 1,000 seeds. The server 170 is programmed to ultimately have cost data expressed in standard units for every location of the farming regions of interest.

In some embodiments, the server 170 is programmed or configured to request input of revenue data from user devices. The revenue data typically includes the market prices of the yields and becomes available around the time when the yield data becomes available. The request is typically presented during the harvesting stage of an agricultural cycle. Alternatively, the revenue data can be requested when a request to perform an RoI analysis is received. It is generally preferable to receive revenue data as early as possible in the current farming season to enable accurate cost-and-benefit calculations as early as possible.

In some embodiments, the server 170 is programmed to receive revenue data from farmer devices. The server 170 can be further programmed to allow a specification of revenue amounts in specific units and perform necessary conversions. For example, for selling a specific seed hybrid, the received revenue data may be expressed as a price per liter, and it can be converted to a standard unit, such as a price per bushel. The server 170 is programmed to ultimately have revenue data expressed in standard units for every location of the farming regions of interest.

3.2 Data Analysis and Presentation

In some embodiments, the server 170 is programmed or configured to receive from a user device a selection from a plurality of types of analysis to be performed or a plurality of types of reports to be generated. The selection generally includes a specification of a duration to limit the scope of the analysis. Examples of the duration include one or more farming seasons or years. Different types of analysis or reports are further discussed below.

In some embodiments, the server 170 is programmed to enable exploration, review, analysis, and/or manipulation of different types of farming data corresponding to an agricultural process implemented on one or more fields or regions. A user computer may specify one or more criteria to identify the one or more regions or fields directly or indirectly. For example, the criteria can include the name or a field, the boundary of a region, the types of soil present, the types of seed hybrids planted, the moisture content, the temperature, or other attributes of individual fields or regions.

In some embodiments, the server 170 is programmed to enable further exploration, review, analysis, and/or manipulation of different components of an RoI analysis, including individual pieces of data that contribute to an RoI analysis or analytical data that correspond to various interactions between the individual pieces of data. The individual pieces of data can include costs of purchasing or planting seed hybrids, collecting or supplying water, purchasing or applying fertilizers, pesticide, or fungicide, harvesting corps, or drying grains as well as revenue from the yields. The individual components can also include sizes, quantities, or other attributes of the seeds, fertilizers, labor, or other items that cost money or produce revenue. The various interactions may include comparisons of different instances of an individual component along time, location, population, or other dimensions, as further discussed below. The various interactions may also include computations of different types of Rot Each type of RoI would be the difference between the revenue and a specific combination of cost components. For example, one type of RoI can be the difference between the revenue and merely the cost of purchasing a particular seed hybrid, while another type of RoI can be the difference between the revenue and all applicable costs incurred during an agricultural process.

In some embodiments, the server 170 is programmed to visually present a digitized graphical map of one or more fields using a computer display device and to overlay additional information on the map, which typically corresponds to a component of an RoI analysis. In this manner, the RoI analysis described herein is not merely mathematical, but serves to drive more efficient presentation of data that can be used to drive specific decisions in the field such as application of seed or nutrients. The map can be interactive or manipulable, allowing a user computer to zoom in or out, move about, or specify a particular region. The overlap can be in the form of specific coloring or shading within certain regions, pop-ups or dialogs on top of the maps, etc. The overlaid information can be limited to a specific location or applicable to an entire region on the map.

In some embodiments, the server 170 is programmed to present two maps concurrently on the same screen. The two maps may have identical or similar features but indicate specific contents in response to user selections. A user computer may specify or change the type of information shown in either map, dismiss a map, or reinvoke a map at any time. By controlling the types of information shown on the two maps, a user computer receives data that is more efficient or better to illustrate a causal relationship or other correlations between different components of an RoI analysis or general progression of the RoI analysis. For example, for each location in one or more fields, one of the maps may indicate the yield data for the current year, and the other map may indicate the overall RoI data for the current year. The two maps together then specify, more efficiently, the effectiveness of determining the utility and profitability of certain seed hybrids based on the yield data alone or based on the overall RoI data that factors financial aspects into consideration.

In some embodiments, the server 170 is programmed to perform various types of comparative analysis and present the analytical results through one of the interactive maps or other data visualization means or in simple media. In a first type, data regarding one or more chosen regions is presented with respect to data regarding to a default region or another region further specified by the user computer or with respect to certain aggregate data. For example, the yield data of a field of a grower may be presented relative to the yield average of all the fields in a geographical region encompassing the grower's field. In a second type, data regarding multiple chosen regions is presented in original values but on the same screen for easy comparison. For example, the RoI data of multiple fields of a grower may be presented on the same screen. In a third type, data regarding one or more chosen regions is presented relative to a previous season or a previous stage of an agricultural cycle. For example, the costs incurred on a field of a grower during the present season so far may be presented relative to the costs incurred on the grower's field during the previous season. In a fourth type, cost data and revenue data regarding one or more chosen regions are presented on the same screen. In a fifth type, different types of cost data regarding one or more chosen regions are presented on the same screen. For example, the costs incurred in preparing the soil of a field of a grower, in sowing, and in irrigating the field, respectively, can be presented on the same screen. In a sixth type, data is presented differently regarding one or more chosen regions and regarding the rest of the regions in a field. For example, given a user-computer-specified criterion of an RoI of more than a certain amount, those regions that have an RoI above that certain amount are shown in one shade while those regions that have an RoI at or below the certain amount are shown in another shade. Other types of comparative analysis along specific dimensions or at certain granularities can be performed and the results can be similarly presented.

In some embodiments, the server 170 is programmed to perform additional types of trend or correlation analysis and present the analytical results through one of the interactive maps or other data visualization means or in simple media. Such trend or correlation analysis can be performed using known machine learning techniques, such as decision trees, regression analysis, or neural networks. For any given set of data, the server 170 can be programmed to identify a strongest portion or a weakest portion and cause them to be highlighted in the presentation. For example, the top 5% and the bottom 5% of the yields can be shown differently from the rest of the yield data. The server 170 can also be programmed to detect patterns or trends and generate predictions accordingly. For example, given the cost data and the revenue data for a field, the server 170 can be configured to determine which one or more types of costs might be highly correlated with the RoI and send such findings to a user device. As a further example, given the yield data and soil or crop treatment data for a field over multiple seasons, the server 170 can be configured to compute a yield consistency and determine which of the one or more types of treatments might have been a main contributor to the yield consistency.

In some embodiments, the server 170 is programmed to utilize the results of trend or correlation analysis to generate recommendations for user computers or adjust interaction with user computers. For example, based on a determination that the cost of a certain type of fungicide fluctuates greatly from year to year, the server 170 can be configured to recommend reducing use of such fungicide to reduce overall risk. For further example, based on a determination of a low variability in the cost of drying corns within a specific geographic area, the server 170 can be configured to reduce the number of requests from user devices for the cost of drying corns for fields within that geographic area. Similarly, based on a detected growth rate of the cost of drying corns over the last few years, the server 170 can be configured to predict the cost for next year and use that as the default value for next year. For further example, based on a determination that the RoI for a specific field remains steady under the same or similar soil or crop treatments over the years, the server 170 can be configured to recommend continued investment in those treatments.

In some embodiments, the server 170 can be programmed to perform certain types of analysis or generate certain types of reports based on a specific schedule, such as at the beginning of each stage of an agricultural cycle. The server 170 can be programmed to further send alerts or notifications to user devices when system- or user-defined trigger conditions are satisfied. An example trigger condition is a steady increase in a particular type of cost or a significant decrease in a certain RoI Such alerts or notifications of certain issues might contain recommendations for remedying these issues and cause user computers to adopt the recommendations or further explore, review, analyze, and/or manipulate different components of the RoI analysis before taking additional actions. For example, one recommendation might be to review the use of the type of farming data associated with the particular type of cost or to consider certain alternatives in the market that typically cost less.

3.3 Example Processes

In some embodiments, the server 170 is programmed to cause presentation of a graphical user interface on a computer display device, in which digitized visual elements receive or represent financial data and other data associated with growers' fields and visualize various results of analyzing such data, including RoI information. As one example, each of FIG. 7, FIG. 8, FIG. 9, FIG. 10, FIG. 11, FIG. 12, FIG. 13, FIG. 14, FIG. 15, FIG. 16, FIG. 17, FIG. 18 illustrates an example screen display of a graphical user interface that the server 170 may generate using programs arranged according to embodiments.

Figure 7:
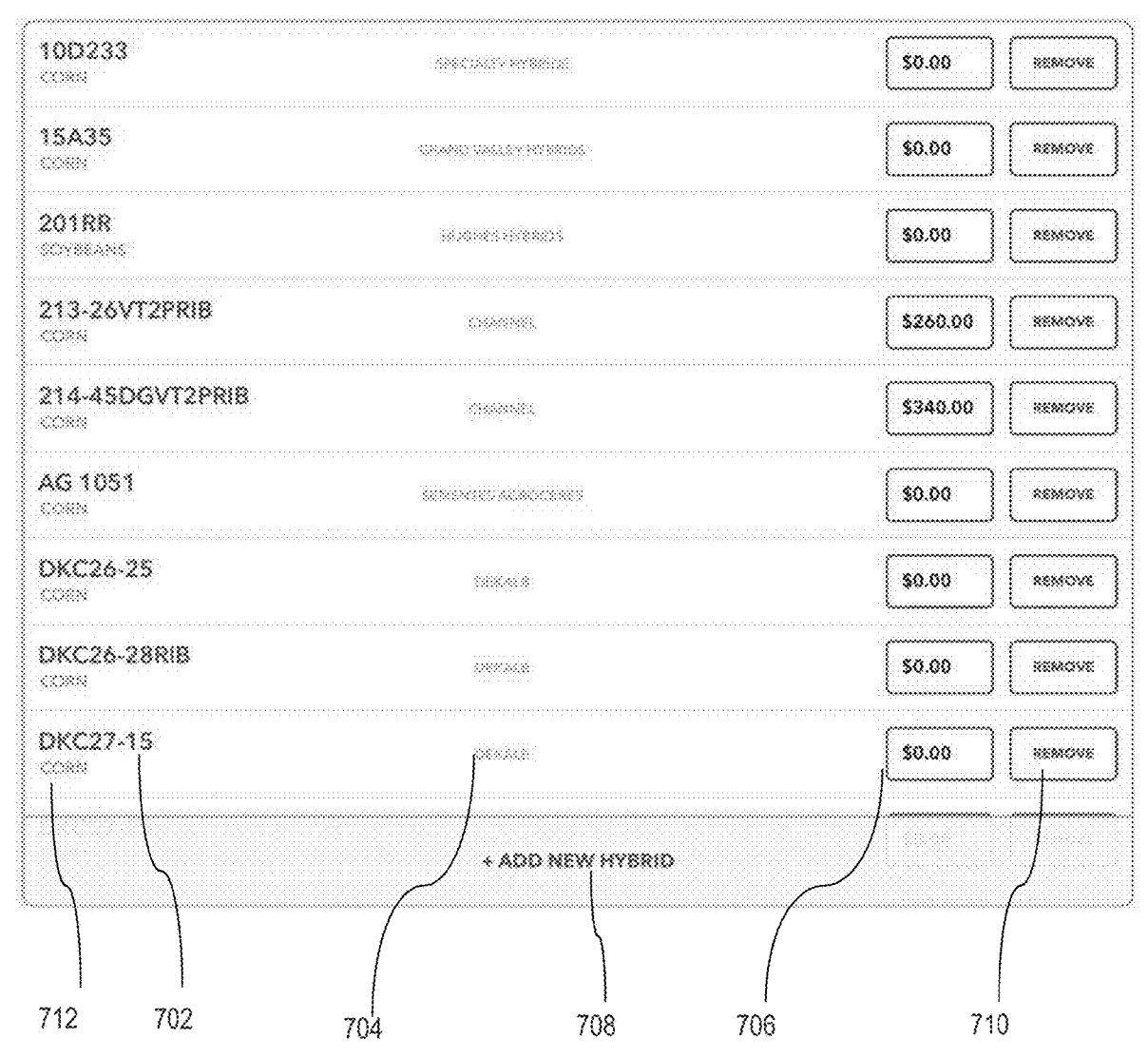

FIG. 7 illustrates an example screen display that is configured to receive cost data for different seed hybrids. The screen includes an option 708 that enables the addition of a new seed hybrid. This screen also includes a list of seed hybrids that have been added or presented, with one row for each seed hybrid. For each hybrid, a name 702, a plant type 712, and a description 704 are displayed. For example, the last seed hybrid on the list has a name of "DKC27-15", a plant type of "corn", and a description of "DEKALB". The screen also includes an option 710 to remove each seed hybrid. In addition, the screen includes an option 706 to provide a price for each seed hybrid. The price can be entered for a specific unit, such as a certain dollar amount per 1,000 seeds. Other types of costs incurred in an agricultural process can be received in a similar manner.

Figure 8:
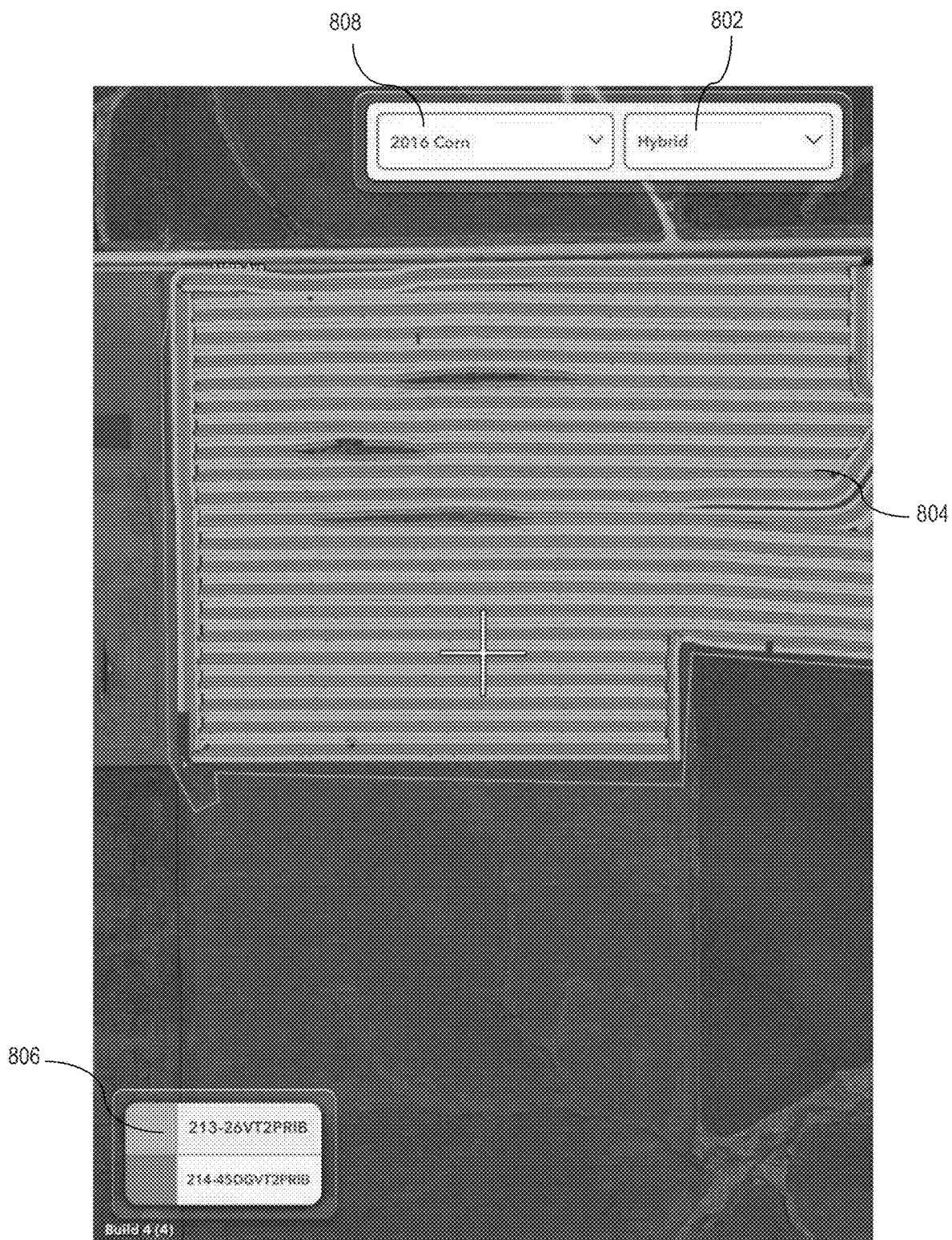
FIG. 8 illustrates an example screen configured to display a map of one or more fields with seed hybrid information.

FIG. 8 illustrates an example screen display that is configured to display a map of one or more fields with seed hybrid information. The screen includes an option 808 that enables the specification of one or more fields, such as by a year of planting and a plant type. For example, the option 808 can have a value or description of "2016 corn". The screen also includes an option 802 that enables the specification of a classification of the one or more fields. For example, the option 802 can have a value of "hybrid", which causes the one or more fields to be differentially displayed by seed hybrid. In addition, the screen includes a classification legend 806 corresponding to the value of the option 802. For example, the classification legend 806 can show the colors or shadings assigned to the two hybrids 213-26VT2PRIB ("213") and 214-45DGVT2PRIB ("214") that are present in the one or more fields. Then screen then includes a map 804 of the one or more fields, with an overlay of the classification information. In this example, the two hybrids are planted in an alternating manner in the one or more fields and are shown in different colors or shadings according to the classification legend 806. In certain embodiments, in response to a user selection of a location on the map, the screen can show additional information, such an actual value (the name of a seed hybrid in this example) associated with the selected location or a summary of all those actual values over the entire field encompassing the selected location.

Figure 9:
FIG. 9 illustrates an example screen configured to display a map of one or more fields with seeding cost information.

FIG. 9 illustrates an example screen configured to display a map of one or more fields with seeding cost information. This screen is similar to the screen illustrated in FIG. 8 and can be displayed in place of or concurrently as the screen illustrated in FIG. 8, for example. The screen includes an option 908 that enables the specification of one or more fields, such as by a year of planting and a plant type. For example, the option 908 can have a value of "2016 corn". The screen also includes an option 902 that enables the specification of a classification of the one or more fields. For example, the option 902 can have a value of "seeding cost", which causes the one or more fields to be differentially displayed by seeding cost. In addition, the screen includes a classification legend 906 corresponding to the value of the option 902. For example, the classification legend 906 can show the colors or shadings assigned to the six ranges of seeding costs in dollars that may be present in the one or more fields, namely >165.00, 146.25-165.00, 127.50-146.25, 108.75-127.50, 90.00-108.75, and <90. The screen then includes a map 904 of the one or more fields, with an overlay of the classification information. In this example, the two seed hybrids 213 and 214 are planted in an alternating manner as illustrated in FIG. 8. These seeding costs can be based on the prices entered via the screen illustrated in FIG. 7. Specifically, the unit cost of the seed hybrid 213 is $260, and the unit cost of the seed hybrid 214 is $340. For each unit location in the map, the unit cost can be multiplied by the number of units used in the unit location to obtain the seeding cost. The different seeding costs for the unit locations in the one or more fields are then shown in different colors or shadings according to the classification legend 906. Other types of costs incurred in an agricultural process can be displayed in a similar manner.

Figure 10:
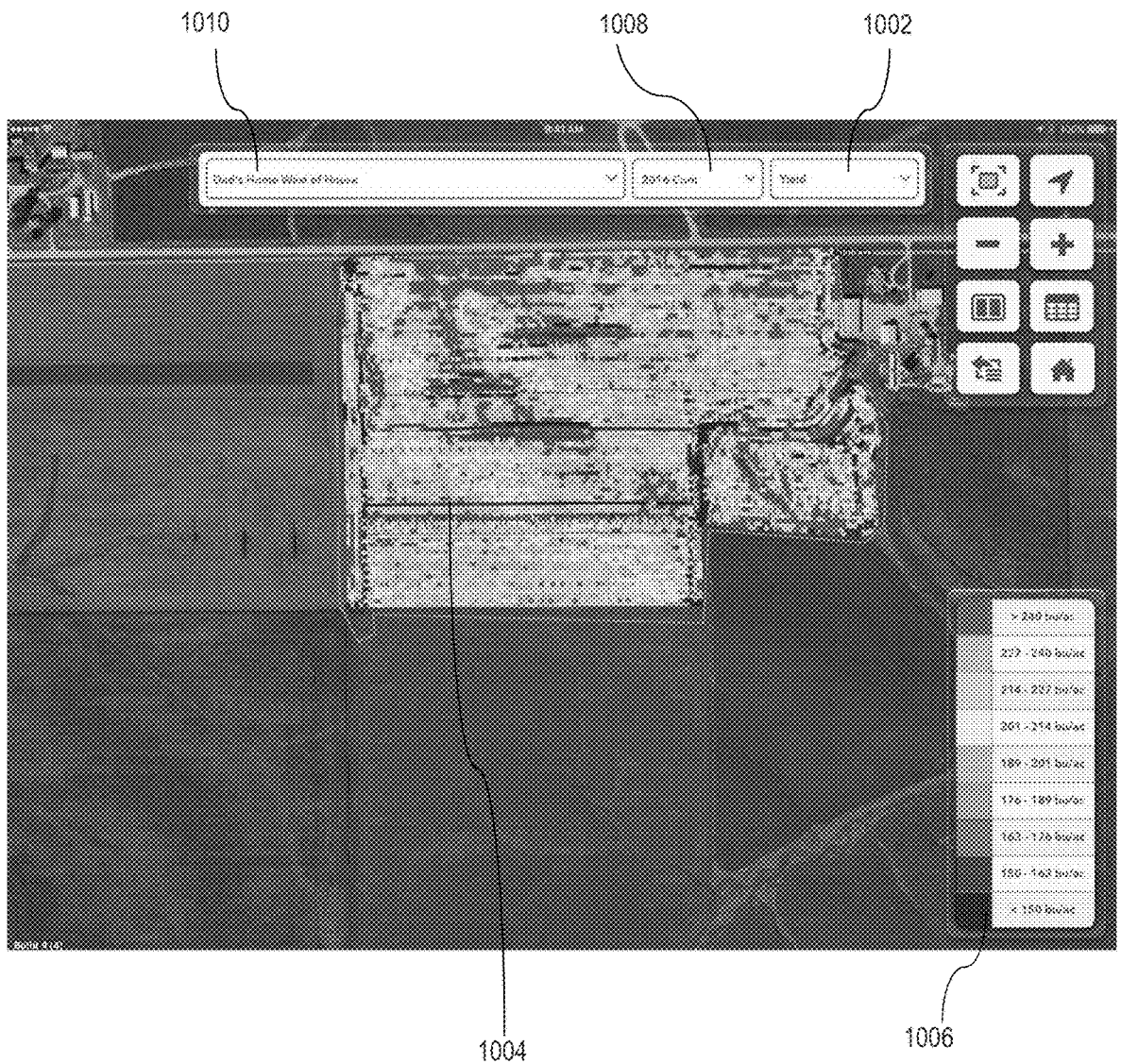
FIG. 10 illustrates an example screen configured to display a map of one or more fields with yield information.

FIG. 10 illustrates an example screen configured to display a map of one or more fields with yield information. This screen is similar to the screen illustrated in FIG. 8 and can be displayed in place of the screen illustrated in FIG. 8 or FIG. 9, for example. The screen includes two options 1008 and 1010 that enable a two-level specification of one or more fields. The option 1010 controls the first level, such as by geographical area, and the option 1008 controls the second level under the first level, such as by a year of planting and a plant type within the geographical area. For example, the option 1010 can have a value of "Dad's Home West of House", and the option 1008 can have a value of "2016 corn". The screen also includes an option 1002 that enables the specification of a classification of the one or more fields. For example, the option 1002 can have a value of "yield", which causes the one or more fields to be differentially displayed by yield. In addition, the screen includes a classification legend 1006 corresponding to the value of the option 1002. For example, the classification legend 1006 can show the colors or shadings assigned to the nine ranges of yields in number of bushels per acre that may be present in the one or more fields. The screen then includes a map 1004 of the one or more fields, with an overlay of the classification information. In this example, the two seed hybrids 213 and 214 are planted in an alternating manner as illustrated in FIG. 8. For each unit location in the map, the yield amount can be converted to the specific unit of the number of bushels per acre. The different yields for the unit locations in the one or more fields are then shown in different colors or shadings according to the classification legend 1006.

Figure 11:
FIG. 11 illustrates an example screen configured to display a map of one or more fields and receive a request for inputting price data for the yield in the one or more fields.

FIG. 11 illustrates an example screen configured to display a map of one or more fields and receive a request for inputting price data for the yield in the one or more fields. The screen can be related to the screen illustrated in FIG. 10 regarding yields, using the information included in that screen as the background. This screen may include one or more options related to yields, such as the option 1102 that enables the setting of a marketing price of the yields. For example, a user computer might have selected a location in the map, and the price can be specified for the seed hybrid used in the selected location.

Figure 12:
FIG. 12 illustrates an example screen configured to receive price data for the yield in the one or more fields.

FIG. 12 illustrates an example screen configured to receive price data for the yield in the one or more fields. The screen can be related to the screen illustrated in FIG. 10 regarding yields, using the information included in that screen as the background. Further, the screen can be presented in response to the selection of the option 1102 illustrated in FIG. 11. The screen includes an option 1202 that allows the specification of a marketing price of the yield at a specific unit, such as $3.25 per bushel.

Figure 13:
FIG. 13 illustrates an example screen configured to display a map of one or more fields with return-on-investment information.

FIG. 13 illustrates an example screen configured to display a map of one or more fields with return-on-investment information. This screen is similar to the screen illustrated in FIG. 8 and can be displayed concurrently as the screen illustrated in FIG. 10, for example. The screen includes an option 1308 that enables the specification of one or more fields, such as by a year of planting and a plant type. For example, the option 1308 can have a value of "2016 corn". The screen also includes an option 1302 that enables the specification of a classification of the one or more fields. For example, the option 1302 can have a value of "return on seed", which causes the one or more fields to be differentially displayed by return on seeding cost. In addition, the screen includes a classification legend 1306 corresponding to the value of the option 1302. For example, the classification legend 1306 can show the colors or shadings assigned to the nine ranges of returns on seeding cost in dollars that may be present in the one or more fields. Then screen then includes a map 1304 of the one or more fields, with an overlay of the classification information. In this example, the two seed hybrids 213 and 214 are planted in an alternating manner as illustrated in FIG. 8. These returns on seeding cost can be based on the seeding costs displayed in the screen illustrated in FIG. 9, the yields displayed in the screen illustrated in FIG. 10, and the marketing prices entered via the screen illustrated in FIG. 12. Specifically, the return or profit can be calculated as the product of the yield and the market price, and the return on seeding cost could be calculated as the difference between the return and the seeding cost. The different returns on seeding cost for the unit locations in the one or more fields are then shown in different colors or shadings according to the classification legend 1306. Such return on seeding cost, which typically constitutes part of the total cost, indicates a relative return and can be especially useful in comparing returns of different farming regions where the associated costs differ mainly in seeding cost. Other types of returns corresponding to other types of costs can be displayed in a similar manner.

Figure 14:
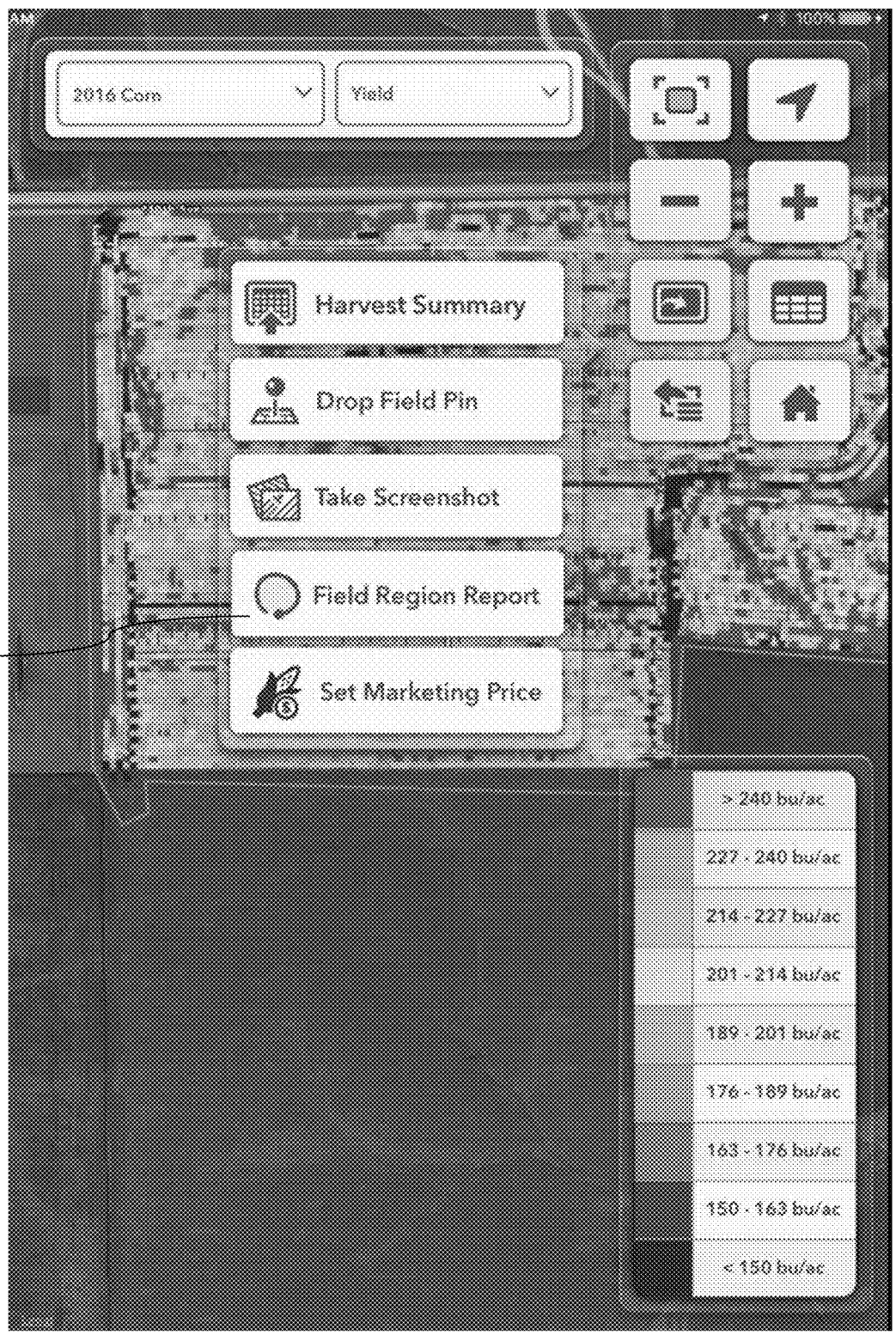
FIG. 14 illustrates an example screen configured to display a map of one or more fields and receive a request to receive a field region report.

FIG. 14 illustrates an example screen configured to display a map of one or more fields and receive a request to receive a field region report. The screen can be related to the screen illustrated in FIG. 10 regarding yields, using the information included in that screen as the background. The screen includes an option 1404 that enables the selection of a field region report to focus on specific regions within the specified one or more fields.

Figure 15:
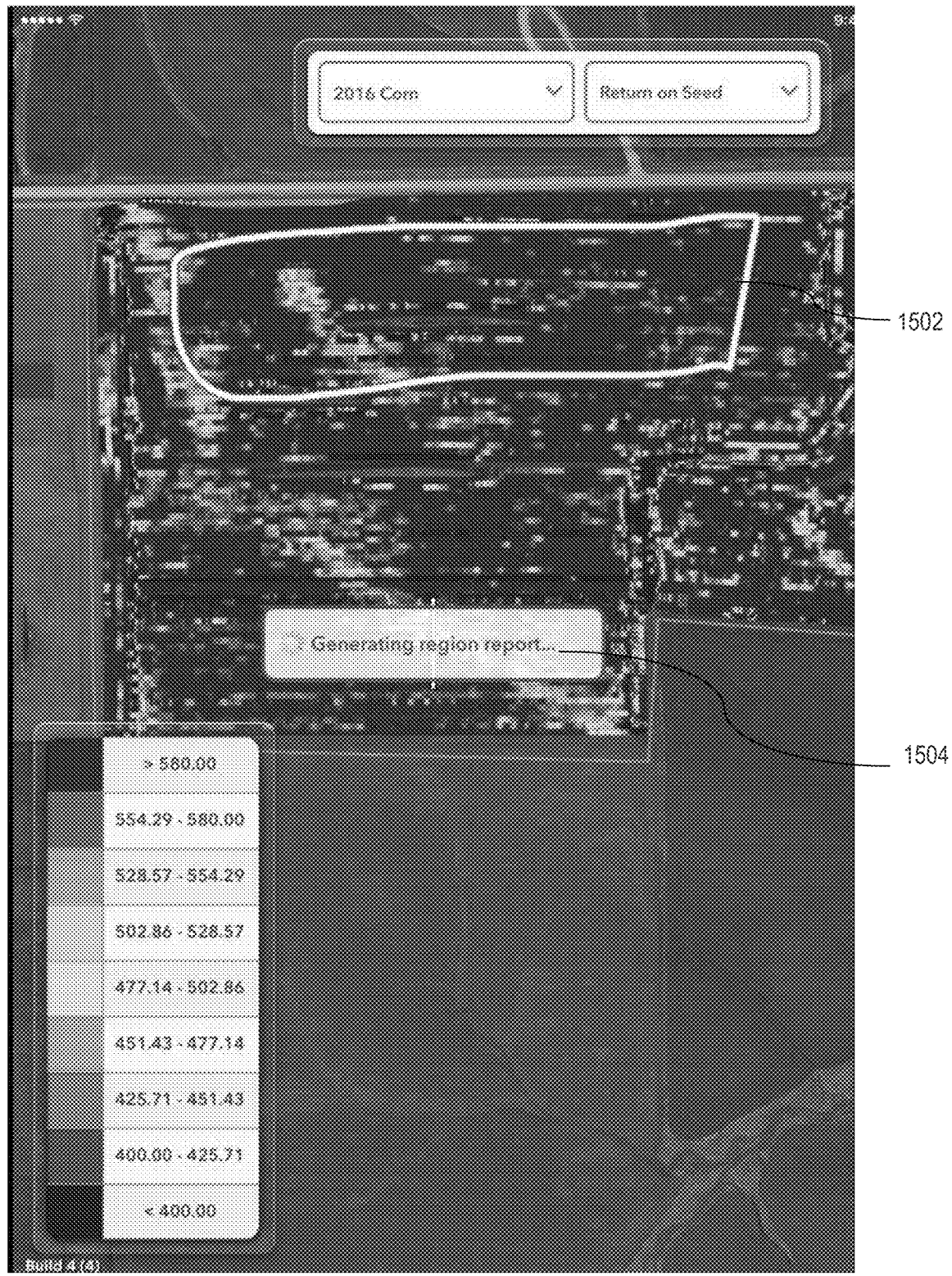
FIG. 15 illustrates an example screen configured to display a map of one or more fields and receive a request to receive a specification of a region within the one or more fields.

FIG. 15 illustrates an example screen configured to display a map of one or more fields and receive a request to receive a specification of a region within the one or more fields. The screen can be presented in response to the selection of the option 1404 illustrated in FIG. 14. The screen can be similar to the screen illustrated in FIG. 8 and can be displayed in place of the screen illustrated in FIG. 13 or FIG. 14, for example. The screen allows specification of a specific region within the specified one or more fields by drawing a boundary 1502 of the specific region on the map, specifying key coordinates of the specific region through separate graphical elements, etc. The specification of the specific region may be the result of touching the screen by hand or via a stylus or interacting with the display with a mouse. In response to the specification, the screen can include a notification 1504 of generating a report for the specified region in real time.

Figure 16:
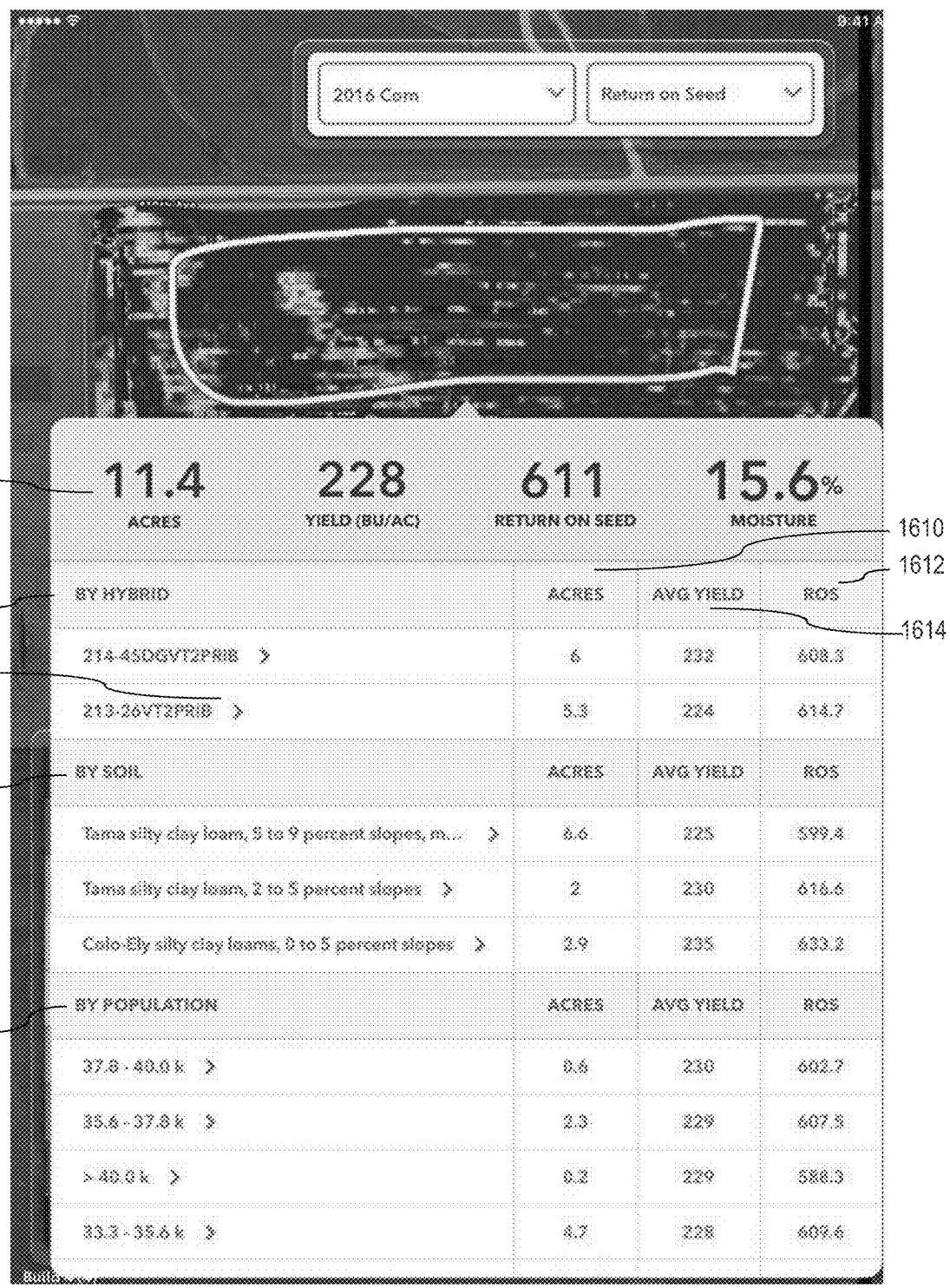
FIG. 16 illustrates an example screen configured to display summary data for a specified region, including size, yield, and return-on-investment information.

FIG. 16 illustrates an example screen configured to display summary data for a specified region, including size, yield, and return-on-investment information. The screen can be presented following the notification illustrated 1504 illustrated in FIG. 15. The screen can be related to the screen illustrated in FIG. 15, using the information included in that screen as the background. The summary data includes an overall summary 1602 of the size, yield, the return on seed, and the moisture content of the specified region. The summary data also includes various statistics for sub-regions of the specified region organized by different attributes. For example, the screen includes a section 1604 where the statistics are shown by hybrid, a section 1606 where the statistics are shown by soil, and a section 1608 where the statistics are shown by population. Within each section for each sub-region, the screen includes a size statistic 1610 in the number of acres, an average yield 1614 statistic in the number of bushels per acre, and a total return on seeding cost statistic 1612 in a dollar amount. Furthermore, the screen allows a user computer to drill into each of the sub-regions. For example, the user computer could further focus on the sub-region where the seed hybrid 214 is planted by clicking on the link 1616. In this example, while the average yield for the seed hybrid 214 is higher the average yield for the seed hybrid 213, the total return on seed for the seed hybrid 214 is lower than the total return on seed for the hybrid 213, showing that the seed hybrid 213 might be more desirable.

Figure 17:
FIG. 17 illustrates an example screen configured to display summary data corresponding to a seed hybrid grown in a specified region, including size, yield, and return-on-investment information.

FIG. 17 illustrates an example screen configured to display summary data corresponding to a seed hybrid grown in a specified region, including size, yield, and return-on-investment information. This screen is similar to the screen illustrated in FIG. 16 but is focused on a specified sub-region. This screen can be presented in response to the selection of the link 1616 illustrated in FIG. 16. The screen includes a description of 1702 of the sub-region, such as the name of a select seed hybrid when the sub-region includes those locations in the specified region where the specific seed hybrid is planted.

Figure 18:
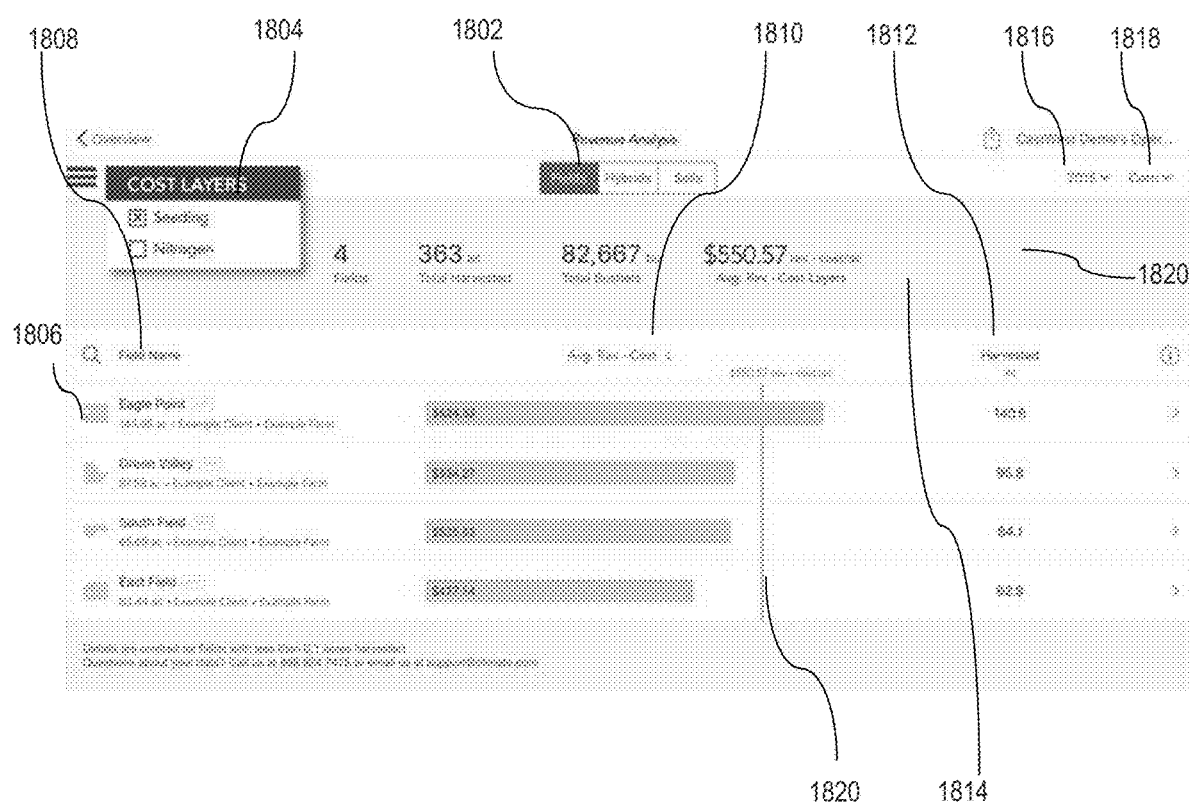
FIG. 18 illustrates an example screen configured to display cost and revenue data for one or more fields.

FIG. 18 illustrates an example screen configured to display cost and revenue data for one or more fields. The screen includes two options 1816 and 1818 that enable the specification of one or more fields, such as by a year of planting and a plant type, respectively. For example, the option 1816 can have a value of "2016" and the option 1818 can have a value of "corn". The screen enables a selection 1804 from a plurality of cost layers of an agricultural process, such as the seeding layer, or the nitrogen layer. More generally, the plurality of cost layers can include any number of combinations of types of costs incurred in an agricultural process. The screen also offers a selection 1802 from a number of region classifications for revenue analysis, such as fields, hybrids, or soil types. For example, a selection of fields leads to a revenue or RoI analysis by field. The rest of the screen includes results of analyzing the selected cost layers with respect to revenue amounts for the specified one or more fields. Specifically, the screen includes a summary 1820 of the cost and revenue data for the one or more fields, including a total number of fields, a total harvest scope in the number of acres, a total harvest volume in the number of bushels, and an average return on cost as the difference between the revenue and the selected seeding cost layer in a dollar amount. The screen also shows specific attributes for sub-regions of the one or more fields based on the selected region classification, such as by field. In this example, for each of the four fields, the screen includes a row 1806 that shows the name 1808, the average difference between the revenue and the cost layer 1810 in a dollar mount, with an indicator of the average 1820 over all the fields for ease of determining how the field average compares to the overall average, and a harvest scope 1812 in a number of acres.

Figure 19:
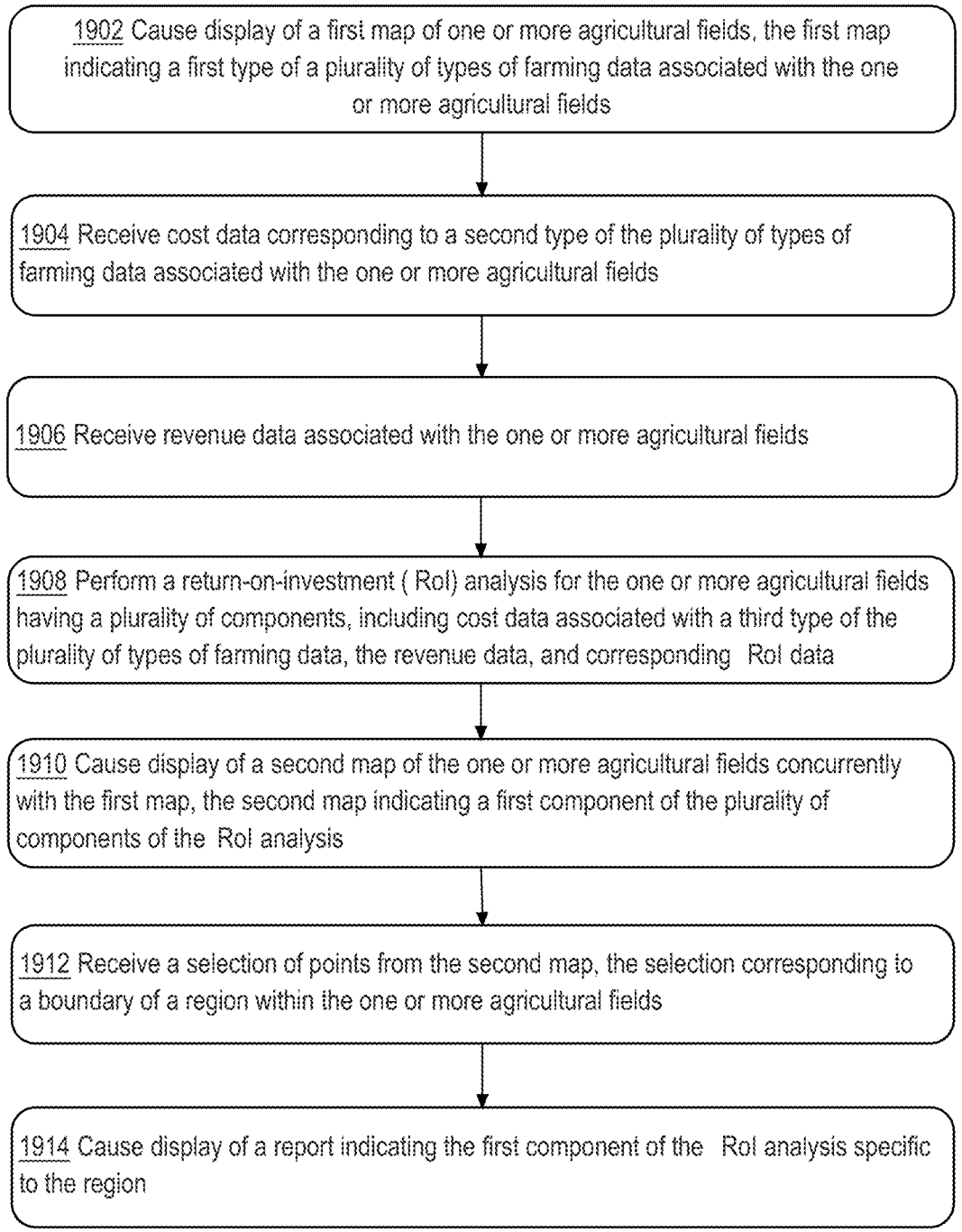
FIG. 19 illustrates an example process performed by the agricultural data management server of managing data related to an agricultural process.

FIG. 19 illustrates an example process performed by the agricultural data management server of managing data related to an agricultural process. FIG. 19 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 1902, the server 170 is programmed or configured to cause display of a first map of one or more agricultural fields. The first map can for each location indicate a first type of a plurality of types of farming data associated with the one or more agricultural fields. The plurality of types of farming data may include seed hybrid data, planting data, soil preparation data, fertilizer application data, irrigation data, harvest data, or grain drying data. While a user computer may initially request reviewing one of the plurality of types of farming data, such as finding out which see hybrids were purchased and ultimately planted in one or more fields, the map can also indicate another type of data, such as a component of an RoI analysis, as further discussed below.

In step 1904, the server 170 is programmed or configured to receive cost data corresponding to a second type of the plurality of types of farming data associated with the one or more agricultural fields. The cost data can be received as soon as a user device is able to provide such data to the server 170. The second type of farming data may be identical to the first type of farming data. In certain embodiments, the server 170 may be configured to enable input of multiple costs on the same screen, such as the costs for different seed hybrids or the costs for purchasing, planting, and harvesting one seed hybrid. In certain embodiments, the server 170 may be configured to allow a user computer to select a location in the first map which indicates a certain seed hybrid being purchased or planted for the selected location and provide a cost for purchasing or planting the seed hybrid.

In step 1906, the server 170 is programmed or configured to receive revenue data associated with the one or more agricultural fields. The revenue data is typically associated with harvested crops or yields but represents a more accurate "return" of the agricultural process than yields. In certain embodiments, the server 170 can be programmed to cause redisplay the first map to indicate yield data for each location in response to a user computer request. Then similarly, the server 170 may be configured to allow a user computer to select a location of the first map which indicates a certain crop being harvested for the selected location and provide a marketing price for selling the certain crop.

In step 1908, the server 170 is programmed or configured to perform an RoI analysis for the one or more agricultural fields having a plurality of components, including cost data associated with a third type of the plurality of types of farming data, the revenue data, and corresponding RoI data. As noted above, the "return" in an RoI analysis here is typically the revenue instead of the yield, the investment could include the costs associated with one or more types of farming data, and the RoI would be the difference between the revenue and the investment. For example, when operations on two fields differ mainly in the seed hybrids grown, the comparative returns on seeds considering only the costs associated with purchasing or planting seed hybrids can be helpful. Other types of comparative analysis may highlight relevant advantage with respect to specific benchmarks or aggregates that correspond to specific geographical areas or time periods.

In step 1910, the server 170 is programmed or configured to cause display of a second map of the one or more agricultural fields on the screen concurrently with the first map. The second map can indicate for each location a first component of the plurality of components of the RoI analysis. For example, after reviewing the yield data in one or more fields via the first map, a grower might be interested in learning what the returns on seeds are in these one or more fields. The second map can then indicate the return on seed for each location. The concurrent display of the first map and the second map facilitates the comparison and contrast of the yields and returns on seeds and the understanding of the impact of incorporating financial details.

In step 1912, the server 170 is programmed or configured to receive a selection of points from the second map, the selection corresponding to a boundary of a region within the one or more agricultural fields. Input from a user computer may specify the boundary in free form, and so the region can include any portion of any of the one or more fields. For example, the user computer may focus on a cluster of locations in the second map that indicate low returns on seeds to better understand what might have caused the low returns. For further example, when the second map indicates a higher return on a seed hybrid for a row in the middle of the field and a lower return on a seed hybrid for another row near a boundary of the field, the user computer may wish to focus on these rows to better understand what might have led to the different returns.

In step 1914, the server 170 is programmed or configured to cause display of a report indicating the first component of the RoI analysis specific to the region. The server 170 can be configured to overlay the report on the second map to enable easy return to the second map. The server 170 can include in the report similar types of information as in the second map but at different granularities. For example, when the second map indicates the return-on-seed data for each location, the report can indicate the return-on-seed data for the specific region according to certain classifications, such as soil type, seed hybrid, or population. The report thus enables a user computer to drill down into different aspects of the specified region of interest.

In other embodiments, one or more of the steps illustrated in FIG. 19 are performed by other computing devices, such as the field manager computing device 104 or the cab computer 115. For example, the field manager computing device 104 can be programmed to perform these steps or at least an RoI analysis based on local data and later communicate the results of performing these steps to the server 170.

4. EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of managing data and display related to an agricultural process, comprising:
   receiving, from a user device, a specification of a geographical area;
   causing, by a processor, a display, by a display device of the user device, of a first map of one or more agricultural fields located within the geographical area, the first map indicating a first type of farming data of a plurality of types of farming data associated with the one or more agricultural fields;
   obtaining, by the processor, from the user device, cost data associated with one or more types of farming data of the plurality of types of farming data and revenue data associated with harvesting of the one or more agricultural fields;
   performing a return-on-investment (RoI) analysis for the one or more agricultural fields having a plurality of RoI components, including cost data associated with a second type of farming data of the plurality of types of farming data, the revenue data, and corresponding RoI data;
   causing a display of a second map of the one or more agricultural fields concurrently by the display device of the user device with the first map, the second map indicating an RoI component of the plurality of RoI components;
   determining that a specific RoI component of the plurality of RoI components satisfies a trigger condition;
   sending an alert including a recommendation for addressing the trigger condition to the user device; and
   using an application controller, which is communicatively coupled to the processor, to control an operating parameter of an agricultural vehicle or implement at the one or more agricultural fields, based on the recommendation.

2. The computer-implemented method of claim 1, wherein the trigger condition is a fluctuation of the cost data associated with the second type of farming data being greater than a certain threshold; and
   wherein the recommendation is reducing usage of a product corresponding to the second type of farming data.

3. The computer-implemented method of claim 1, wherein the trigger condition is a fluctuation of the RoI data associated with the second type of farming data being less than a certain threshold; and
   wherein the recommendation is continuing usage of a product corresponding to the second type of farming data.

4. The computer-implemented method of claim 1, wherein the trigger condition is a decrease of RoI in the RoI data associated with the second type of farming data; and
   wherein the recommendation is considering an alternative to a product corresponding to the second type of farming data.

5. The computer-implemented method of claim 1, further comprising:
   determining a trend over a period of time in cost data associated with a third type of farming data of the plurality of types of farming data; and
   adjusting a frequency of requesting cost data associated with the third type of farming data based on the determining.

6. The computer-implemented method of claim 1, wherein the user device includes a cab computer of an agricultural apparatus in the one or more agricultural fields; and
   wherein the first type of farming data is yield from the harvesting of the one or more agricultural fields; and
   wherein the first map indicates a differential display of the yield over different yield ranges, which are indicated by different coloring and/or shading in the first map, for each field of the one or more agricultural fields.

7. The computer-implemented method of claim 1, wherein the second type of farming data is seeding data; and
   wherein the second map indicates a differential display of the RoI data associated with the seeding data over different RoI ranges for each field of the one or more agricultural fields.

8. The computer-implemented method of claim 1, further comprising causing a display of a report on the second map, the report including the RoI component at a different granularity from the second map.

9. The computer-implemented method of claim 1, further comprising receiving a user interaction with the first map, the user interaction indicating price data associated with the first type of farming data for a region on the first map;
    wherein the first type of farming data is yield; and
    wherein the obtaining comprises calculating the revenue data associated with the first type of farming data based on the price data associated with the first type of farming data.

10. The computer-implemented method of claim 1, further comprising, before causing the display of the second map, causing a display of a third map of the one or more agricultural fields concurrently with the first map;
    wherein the first map indicates the first type of farming data associated with the one or more agricultural fields during a first season; and
    wherein the third map indicates the first type of farming data associated with the one or more agricultural fields during a second, different season.

11. The computer-implemented method of claim 1, wherein the performing comprises determining a relationship between each of a plurality of types of cost data with the RoI data; and
    wherein the method further comprises transmitting a result of the performing to the user device.

12. The computer-implemented method of claim 1, further comprising:
    receiving a selection of a region on the first map, the region corresponding to a specific seed hybrid; and
    receiving the cost data comprising receiving a cost for purchasing or planting the seed hybrid in the region.

13. A non-transitory, computer-readable storage medium storing instructions which, when executed by one or more computing devices, cause performance of a method of managing data and display related to an agricultural process, the method comprising:
    receiving, from a user device, a specification of a geographical area;
    causing a display, by a display device of the user device, of a first map of one or more agricultural fields, the first map indicating a first type of farming data of a plurality of types of farming data associated with the one or more agricultural fields;
    obtaining cost data associated with one or more types of farming data of the plurality of types of farming data, from the user device, and revenue data associated with harvesting of the one or more agricultural fields;
    performing a return-on-investment (RoI) analysis for the one or more agricultural fields having a plurality of RoI components, including cost data associated with a second type of farming data of the plurality of types of farming data, the revenue data, and corresponding RoI data;
    causing a display of a second map of the one or more agricultural fields concurrently by the display device of the user device with the first map, the second map indicating an RoI component of the plurality of RoI components;
    determining that a specific RoI component of the plurality of RoI components satisfies a trigger condition;
    sending an alert including a recommendation for addressing the trigger condition to a user device; and
    using an application controller, which is communicatively coupled to the one or more computing devices, to control an operating parameter of an agricultural vehicle or implement at the one or more agricultural fields, based on the recommendation.

14. The non-transitory, computer-readable storage medium of claim 13, wherein the trigger condition is a fluctuation of the cost data associated with the second type of farming data being greater than a certain threshold; and
    wherein the recommendation is reducing usage of a product corresponding to the second type of farming data.

15. The non-transitory, computer-readable storage medium of claim 13, wherein the trigger condition is a fluctuation of the RoI data associated with the second type of farming data being less than a certain threshold; and
    wherein the recommendation is continuing usage of a product corresponding to the second type of farming data.

16. The non-transitory, computer-readable storage medium of claim 13, wherein the trigger condition is a decrease of RoI in the RoI data associated with the second type of farming data; and
    wherein the recommendation is considering an alternative to a product corresponding to the second type of farming data.

17. The non-transitory, computer-readable storage medium of claim 13, wherein the user device includes a cab computer of an agricultural apparatus in the one or more agricultural fields; and
    wherein the first type of farming data is yield; and
    wherein the first map indicates a differential display of the yield over different yield ranges for each field of the one or more agricultural fields.

18. The non-transitory, computer-readable storage medium of claim 13, wherein the second type of farming data is seeding data; and
    wherein the second map indicates a differential display of the RoI data associated with the seeding data over different RoI ranges for each field of the one or more agricultural fields.

19. The non-transitory, computer-readable storage medium of claim 13, wherein the method further comprises receiving a user interaction with the first map, the user interaction indicating price data associated with the first type of farming data for a region on the first map;
    wherein the first type of farming data is yield; and
    wherein the obtaining comprises calculating the revenue data associated with the first type of farming data based on the price data associated with the first type of farming data.

20. The non-transitory, computer-readable storage medium of claim 13, wherein the method further comprises:
    receiving a selection of a region on the first map, the region corresponding to a specific seed hybrid; and
    receiving the cost data comprising receiving a cost for purchasing or planting the seed hybrid in the region.

\* \* \* \* \*